(No Model.)

A. WARENSKJOLD.
NUT LOCK.

No. 481,214.  Patented Aug. 23, 1892.

WITNESSES:
Donn Twitchell
C. Sedgwick

INVENTOR:
A. Warenskjold
BY
ATTORNEYS

UNITED STATES PATENT OFFICE.

AXEL WARENSKJOLD, OF SAN DIEGO, CALIFORNIA.

NUT-LOCK.

SPECIFICATION forming part of Letters Patent No. 481,214, dated August 23, 1892.

Application filed November 25, 1891. Serial No. 413,036. (No model.)

*To all whom it may concern:*

Be it known that I, AXEL WARENSKJOLD, of San Diego, in the county of San Diego and State of California, have invented a new and Improved Nut-Lock, of which the following is a full, clear, and exact description.

The invention relates to improvements in safety-nuts for wagon-axles, bolts, and the like; and its object is to provide a new and improved nut-lock which is simple and durable in construction, very effective in operation, and readily applied.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
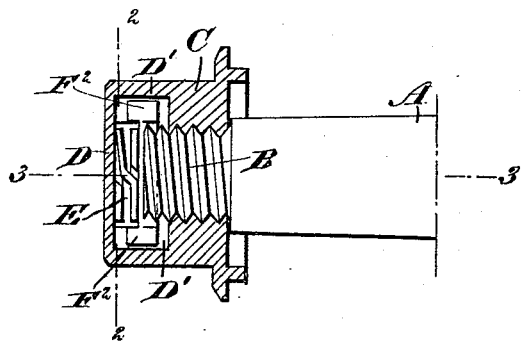
Figure 2:
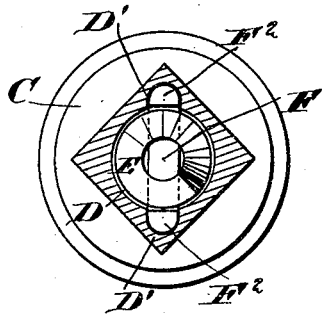
Figure 3:
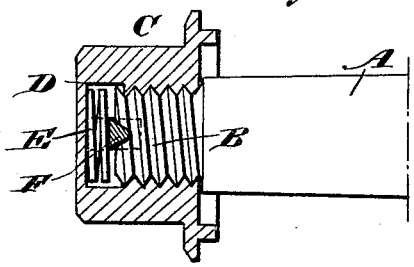
Figure 5:
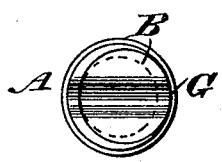
Figure 4:
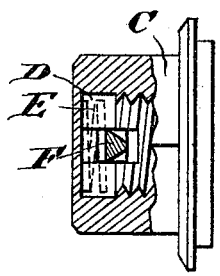

Figure 1 is a sectional side elevation of the improvement as applied to an axle. Fig. 2 is a transverse section of the same on the line 2 2 of Fig. 1. Fig. 3 is a sectional plan view of the same on the line 3 3 of Fig. 1. Fig. 4 is a plan view of the nut with parts broken out. Fig. 5 is an end view of the axle or bolt, and Fig. 6 is a perspective view of the key.

The improved nut-lock, as illustrated in the drawings, is applied to an axle A, formed at each end with the usual thread B, on which screws the nut C, adapted to be locked in place. The nut C is formed with a recess D in the rear of its threaded opening, as is plainly shown in Figs. 1, 3, and 4, and in this opening is held a coiled spring E, resting with one end against the inner wall of the nut and with its other end pressing on a key F, having a wedge-shaped shank F', adapted to engage a recess or groove G, formed diametrically on the end of the threaded portion B of the axle, as is plainly shown in the drawings. The groove or recess G is V-shaped to correspond to the V-shaped shank F', and the ends of the said groove G are rounded to permit the shank F' to readily pass into or out of the same when the nut C is turned.

Figure 6:
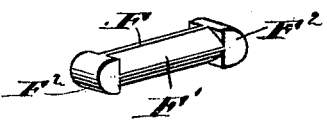

The key is provided at the ends of its shank F' with heads F², preferably made semicircular in shape, as is plainly shown in Fig. 6, the said heads fitting into correspondingly-shaped recesses D', extending from the recess D in the nut, as is plainly illustrated in Fig. 2. The recesses D' extend longitudinally in the nut C and permit the key F to slide against the tension of the spring on the end of the threaded portion B of the axle. It will be seen that the key F, when in place in the nut C, is pressed on by the spring, and when the nut C is screwed on the threaded portion B of the axle or on a bolt then the key F finally comes in contact with the threaded end and is pressed thereon by the spring E. On the turning of the nut C the V-shaped shank F' of the key passes into the recess G, and the nut C is turned farther by applying a wrench or other means, the shank passing out of the said recess to make another half-turn to again engage the said recess. The spring E is by the further screwing of the nut, however, more compressed by the outward sliding motion of the key F, so that the key is pressed into the recess with considerable force. When the nut has finally been screwed up and the key rests in the recess G, then the nut is securely locked in place, as the key engaging the recess G prevents the nut from turning. By applying a wrench or other tool the nut may be unscrewed, but sufficient force is necessary to first unseat the key from the recess G against the tension of the spring E.

It will be seen that the nut-lock is very simple and durable in construction and can be readily applied. As the key F and the spring E are always in position within the nut C and cannot be lost the nut is always ready to be attached.

Having thus described my invention, I claim as new and desire to secure by Letters Patent—

1. A longitudinally and internally grooved nut provided with a longitudinally-sliding spring-pressed key crossing the bore of the nut, the said spring pressing the key toward that end of the bore which receives the bolt, substantially as set forth.

2. The combination, with a bolt formed transversely across the face of its threaded end with a recess, of a nut screwing on the said bolt, a key fitted to slide longitudinally in the said nut in the rear of its threaded opening, the said key being adapted to engage the recess in the end of the said bolt, and a spring held in said nut and pressing the said key toward the end face of the bolt, substantially as shown and described.

3. In a nut-lock, the combination, with a nut, of a key fitted to slide in the said nut in the rear of its threaded opening, the said key having a wedge-shaped shank and heads, the said nut having longitudinally-extending grooves in rear of its threaded opening and receiving said heads, substantially as shown and described.

4. In a nut-lock, the combination, with a nut, of a key fitted to slide in the said nut in the rear of its threaded opening, the said key having a V or wedge shaped shank and heads, the said nut having longitudinally-extending grooves in rear of its threaded opening and receiving said heads, and a spring pressing on the said key to engage its V-shaped shank with a recess in the end of the bolt, substantially as shown and described.

AXEL WARENSKJOLD.

Witnesses:
J. B. NIELSEN,
H. LALULL.